United States Patent [19]

Marginean et al.

[11] 4,289,535

[45] Sep. 15, 1981

[54] HEAT SENSITIVE COATING

[75] Inventors: Barry L. Marginean, Scottsville; Warren A. Hookway, Jr., Pittsford, both of N.Y.

[73] Assignee: Labelon Corporation, Canandaigua, N.Y.

[21] Appl. No.: 130,364

[22] Filed: Mar. 14, 1980

[51] Int. Cl.[3] .......... C09D 11/00

[52] U.S. Cl. .......... 106/19; 106/21

[58] Field of Search .......... 106/22, 21, 19; 282/27.5; 427/145

[56] References Cited

U.S. PATENT DOCUMENTS 4,168,845 9/1979 Oeda et al. .......... 282/27.5

*Primary Examiner*—Lorenzo B. Hayes
*Assistant Examiner*—Amelia B. Yarbrough
*Attorney, Agent, or Firm*—Cumpston & Shaw

[57] ABSTRACT

A heat-sensitive coating composition for a thermoresponsive printing or recording record material for thermal printing devices comprising a color-forming amount of a finely divided solid chromogenous basic 3,3-bisarylphthalane derivative, and a color-developing amount of a finely divided solid phenol derivative which at thermal printing temperature is at least partially fluidizable and capable of a color-forming reaction with the chromogenous 3,3-bisarylphthalane derivative distributed in a carrier composition comprising a substantially water soluble anionic polysaccharide gum and a stability enhancing amount of sucrose benzoate.

13 Claims, No Drawings

HEAT SENSITIVE COATING

BACKGROUND OF THE INVENTION

The present invention relates to a heat sensitive paper for thermal printing devices and a heat sensitive coating composition for such papers comprising a chromogenous basic triphenylmethane derivative, in particular a basic diarylphthalide derivative, and an acidic phenolic color-developer in a carrier composition.

The color-forming reaction between a substantially colorless chromogenous leucoform of a basic triphenyl methane dyestuff, in particular a chromogenous basic diphenylphthalane derivative, and an active acidic color developer, in particular a phenolic compound and/or an active inorganic solid such as clay or attapulgite, has been widely used in the field of duplication and printing processes, e.g. for the production of transfer and copying papers (see, e.g. U.S. Pat. Nos. 3,244,548 in the name of Sullivan et al. and 3,356,229 and 3,244,550 in the name of Farnham et al.).

Two principally different types of coating compositions for copying and transfer papers are known, namely pressure sensitive and heat sensitive coatings.

Pressure sensitive record materials are commonly surface coated with a composition wherein the chromogenous compound is included in microscopic pressure-rupturable capsules. These capsules consist of a nucleus of an oily liquid containing the chromogenous compound and a rugged shell which is impermeable to the oil and is formed by preparing an emulsion of the chromogen-containing oil in an aqueous solution of gum arabic and gelatin and curing the liquid film of gum arabic/gelatin surrounding the oil droplets with formaldehyde. A solid acidic color developing substance is included in the same coating composition yet outside the capsules or in a separate coating, if desired on a second paper, e.g. in the case of manifold material.

Upon locally applying printing or writing pressure to the material, the gum-arabic-gelatin-formaldehyde film will rupture, releasing the chromogenic liquid from the capsules and allowing the chromogen to come into contact with the active acidic color developer and to form a colored mark at the site of the applied pressure. Pressure sensitive record materials are disclosed, e.g. in U.S. Pat. Nos. 2,730,456 and 2,703,457. U.S. Pat. No. 3,920,510 discloses a pressure sensitive coating composition for copying paper, wherein the pressure-rupturable capsules contain a solution of a chromogenous fluoran compound in monoisopropyldiphenyl surrounded by a cured gum arabic-gelatin-formaldehyde film.

In the preparation of heat-sensitive compositions the formation of microcapsules is eliminated. Instead, the chromogenic compound and the phenolic color-developer both are distributed in finely divided solid form in a carrier or binder, in particular a polyvinylalcohol. Upon local application of heat, one of the color-forming reactants, usually the phenolic compound, is fluidized thus leading to an intimate contact between the two color-forming reactants and the taking place of the color-forming reaction localized at the site of heating at thermal printing temperatures. Heat-sensitive record materials containing a chromogenous and a color developing compound distributed in a polyvinyl alcohol coating composition are disclosed in U.S. Pat. No. 3,920,510, in U.S. Pat. No. 3,539,375 and in U.S. Pat. No. 3,674,535. Polyvinyl alcohol, which is a non-ionic water soluble polymer, is the most commonly used carrier-binder component in heat-sensitive coating compositions for thermal printing. Other additives may be added such as gum arabic which is disclosed in U.S. Pat. No. 4,168,845.

Conventional heat-sensitive coating compositions and papers for thermal printing coated therewith suffer from various disadvantages, such as a tendency for premature self-color development, lack of environmental stability, i.e. to heat, moisture and light, as well as an undesirable degree of pressure sensitivity of the coated paper. They also suffer from an inability to be coated on commodity grade paper without hinderence to performance. Cumbersome stock characteristics, that is, a tendency of the coated paper to not move freely during the heat-printing process and adhere to the printing head have been a problem. U.S. Pat. No. 4,168,845, the entire disclosure of which is herein incorporated by reference, describes an attempt to alleviate this problem by adding to the compositions a pigment with a specific oil absorption value.

SUMMARY OF THE INVENTION

It is an object of the present invention to provide a heat-sensitive record material for thermal printing devices, in particular a heat-sensitive paper sheet, and a heat sensitive coating composition therefore with improved printing and storage characteristics.

Especially, it is an object of the present invention to provide a coated heat-sensitive paper wherein any stick tendencies of the paper during the heat-printing process due to melting or softening of the coating under the heat and adherence of the re-solidified coating to e.g. the printing head is substantially eliminated, and free movement of the paper during the printing process is ensured.

It is a further object of the present invention to provide such a heat-sensitive paper which leads to a substantial reduction of the noise level during the printing process.

It is a further object of the present invention to provide a coated heat-sensitive paper which is practically free of any tendency of curling of the paper upon slitting.

It is a further object of the present invention to provide a coated heat-sensitive paper with improved moisture stability.

It is a further object of the present invention to provide a heat-sensitive paper with increased color sensitivity at usual thermal printing temperatures leading to dense color images.

It is a further object of the present invention to provide a heat-sensitive paper having a high degree of whiteness and a high degree of storage stability under normal storage conditions for any thermal products.

It is a further object of the present invention to provide a heat-sensitive paper which does not exhibit an undesirable degree of pressure sensitivity.

It is a further object of the present invention to provide a heat-sensitive paper and a heat-sensitive coating composition wherein the tendency for self-color development and undesired sheet coloration are largely eliminated.

It is a further object of the present invention to provide a heat-sensitive coating composition yielding with water a coating formulation which exhibits outstanding longevity and a low viscosity at higher concentration facilitating uniform coating of the paper and which after being applied to the paper exhibits good drying characteristics.

In order to accomplish the foregoing objects, according to the present invention, there is provided a heat-sensitive coating composition which comprises a color-forming amount of a finely divided solid chromogenous basic 3,3-bisarylphthalane derivative, and a color developing amount of a finely divided solid phenol derivative which at thermal printing temperature is at least partially fluidizable and capable of a color-forming reaction with the chromogenous 3,3-bisarylphthalane derivative distributed in a carrier composition comprising a substantially water soluble anionic polysaccharide gum and a stability enhancing amount of sucrose benzoate. The carrier composition may further comprise a filler selected from the group consisting of di(lower alkyl)dithiocarbamates and lower alkylxanthates of lead, zinc, cadmium and alkaline earth metals and tetra (lower alkyl) thiuram disulfides and di(lower alkyl) xanthogens. Also, the carrier composition further comprises a high molecular polymer selected from the group consisting of micronized polyolefins and micronized modified polyolefins.

DETAILED DESCRIPTION OF THE INVENTION

It has been found that heat-sensitive coating compositions and coated papers for thermal printing of superior quality, in particular of increased longevity and stability, are obtained when the chromogenous bisarylphthalane derivatives and color developing phenols used therein are incorporated in a binder-carrier composition which comprises a substantial amount of a substantially water soluble anionic polymer binder which is a polysaccharide gum and sucrose benzoate.

The chromogenous bases which can be used in the present invention are arylphthalane derivatives including compounds having the following structural 3,3-bisphenylphthalane element

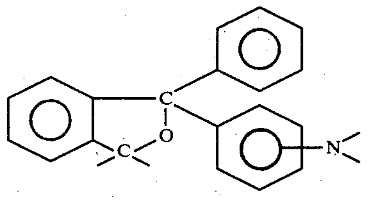

wherein the benzene nuclei may be further substituted. These chromogenous compounds are well known in the art and include chromogenous compounds disclosed in U.S. Pat. No. 3,560,229, the disclosure of which is hereby incorporated by reference and U.S. Pat. No. 4,168,845.

Examples of particularly suitable chromogenous compounds include compounds having the formula

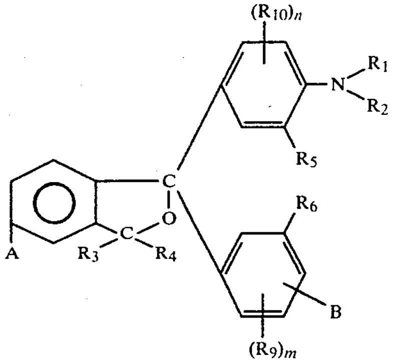

wherein $R_1$ and $R_2$ may be the same or different and represent hydrogen or lower alkyl;

$R_3$ and $R_4$ each represent hydrogen, or $R_3$ and $R_4$ together represent oxo;

$R_5$ and $R_6$ each represent hydrogen or together represent oxo;

A represents hydrogen or a

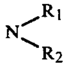

group wherein $R_1$ and $R_2$ are as defined above, and B represents hydrogen or a substituent which if $R_5$ and $R_6$ represent hydrogen preferably is in p-position and represents a

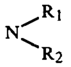

group wherein $R_1$ and $R_2$ are as defined above or a O-$R_7$ group wherein $R_7$ is lower alkyl; or which if $R_5$ and $R_6$ together represent oxo preferably is in m-position and represents a

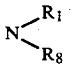

group wherein $R_1$ is as defined above and $R_8$ represents hydrogen, lower alkyl, phenyl, phenyl substituted by halogen, preferably chlorine, or lower alkyl, preferably methyl;

$R_9$ and $R_{10}$ may be the same or different and represent methyl or halogen, in particular chlorine or bromine; and n and m may be the same or different and represent a number between zero and 3.

Chromogenous compounds within the above group are 3,3-bis(p-di(lower alkyl)aminophenyl) phthalides optionally carrying a further di(lower alkyl) amino group in the phthalide nucleus, and 3-di(lower alkyl-)amino-7-anilo fluorans, such as 3-diethylamino-7-(p-chloroanilino) fluoran.

Another group of particularly suitable chromogenous basic 3,3-bisarylphthalane derivatives includes compounds wherein the aryl groups are heterocyclic basic aryl groups, e.g. indol groups, in particular compounds of the formula

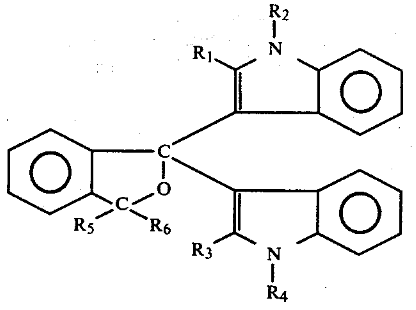

wherein $R_1$ and $R_3$ which may be the same or different represent hydrogen or lower alkyl, preferably containing 1 to 4 carbon atoms, in particular methyl;

$R_2$ and $R_4$ which may be the same or different represent hydrogen or lower alkyl, preferably containing 1 to 4 carbon atoms, in particular ethyl or methyl; and $R_5$ and $R_6$ each represent hydrogen or $R_5$ and $R_6$ together represent oxygen.

A wide variety of phenol derivatives which are useful as color developing reagents in heat-sensitive coating compositions are well known in the art. In order to obtain a stable composition, the phenol has to be solid and exhibit only a minor vapor pressure at room temperature. Yet it should at least partially liquify and/or vaporize at normal thermal printing temperatures in order that intimate contact of the phenol with the chromogenous compound is achieved and the color-forming reaction takes place at the site of heating. Suitable phenolic compounds include alkyl and/or aryl substituted monophenols, diphenols and triphenols. Examples of suitable phenols are disclosed in U.S. Pat. Nos. 3,539,375, 3,244,548 and 3,244,550, the disclosures of which are hereby incorporated by references.

Preferred phenol derivatives include bis-phenols of the formula

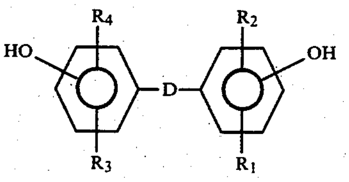

wherein

D represents a bond or a lower alkylidene group, preferably containing 1 to 4 carbon atoms, in particular methylene, isopropylidene, or 2,2-butylidene, or 1,1-cyclohexylidene; the OH groups are in ortho- or preferably in para-position to D;

$R_2$ and $R_4$ which may be different but preferably are the same, represent hydrogen, halogen, in particular chlorine or bromine, lower alkyl, preferably containing 1–4 carbon atoms, in particular methyl or tert, butyl, or hydroxy; and $R_1$ and $R_3$ which may be different but preferably are the same, represent methyl or halogen, in particular chlorine or bromine.

4,4'-Isopropylidene bis-phenol is particularly preferred.

Other suitable phenol compounds include naphthols, lower alkyl substituted phenols, e.g. tert butylphenols, phenyl substituted phenols and phenoxy substituted phenols.

As is well known to anyone skilled in the art, the type of chromogenic compounds or mixtures thereof and of the phenol used will of course vary depending on the desired color of the colored marks which are produced on the heat-sensitive paper during thermal printing. Equally, the amount of chromogenic compound and color-developing phenol will vary largely depending on the type of compounds which are used and on the desired shade and intensity of color in the produced colored marks.

For example, for obtaining blue-colored marks, a combination of 3,3-bis(p-dimethylaminophenyl) phthalide, known as "brilliant violet leuco" and of 4,4'-isopropylidenediphenol, known as bisphenol A is preferred. Satisfactory results are obtained with coating compositions containing from about 9 to about 30, preferably from about 10 to about 15% by weight of 3,3-bis(p-dimethylaminophenyl) phthalide and from about 16 to about 36, preferably from about 30 to about 35% by weight of bisphenol A, relative to the amount of solids in the coating composition.

Both the chromogenous compound and the phenol have to be distributed throughout the coating in finely divided form, preferably in the form of particles having a particle size of from about 1 to about 3 microns.

It has been found that substantially water soluble anionic polysaccharides modified by additions of stabilizing amounts of sucrose benzoate as a binder-carrier material in the carrier composition provide excellent properties, in particular increased stability to the coating composition and the coated paper, as well as to the wet formulation of the coating composition.

The amounts of substantially water soluble anionic polysaccharide gum and of sucrose benzoate in the carrier composition may vary, depending, e.g. on the desired viscosity of the wet mix of the composition and/or the desired amount of the composition to be applied to the record material.

Satisfactory results are obtained using from about 16 to about 50, preferably from about 30 to about 35% by weight of the substantially water soluble gum and from about 3 to about 10, preferably from about 5 to about 8% by weight of sucrose benzoate relative to the total amount of solids in the coating composition.

Substantially water soluble anionic polysaccharide gums which can be used as binder and carrier material in the carrier composition according to the present invention include gum arabic and varying amounts of gum karaya, water soluble alginates, agar and agaroid gums, caragee and carrageenan, and carboxymethyl cellulose. By varying the amounts other substantially water soluble anionic polysaccharide gums in combination with the gum arabic, the viscosity of the composition may be readily controlled to any desirable level.

Gum arabic is particularly effective, since even when used in relatively high concentrations it does not provoke an excessive viscosity increase in the aqueous formulation of the coating composition, and facilitates application and drying of the coating on the paper. The heat-sensitive papers prepared with a coating composition containing a substantial amount, e.g., of above 30% by weight, of gum arabic exhibit an excellent printing behavior, such as good color development and low residue and print interference.

Suitably, the heat-sensitive coating composition further includes a functional filler material which serves to reduce noise levels and stick tendencies.

Functional filler materials include compounds of the general formula

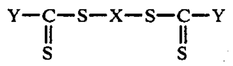

wherein X represents a bond or a metal selected from the group consisting of lead, zinc, cadmium and alkaline earth metals and Y represents lower alkyloxy or lower dialkylamino. Suitably such compounds include di(-lower alkyl) dithiocarbamates of the formula

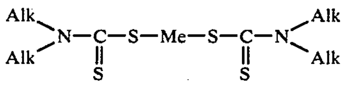

wherein Alk represents lower alkyl, preferably containing 1 to 4 carbon atoms, such as, e.g. methyl, ethyl, isopropyl or n-butyl; and Me represents one of the above cited metals, preferably zinc;

lower alkylxanthates of the formula

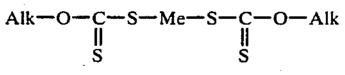

wherein Alk is as defined above and preferably represents isopropyl or ethyl, and Me is as defined above and preferably represents zinc;

tetra(lower alkyl) thiuram disulfides of the formula

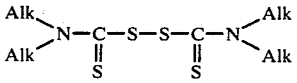

wherein Alk is as defined above and preferably represents methyl; and di(lower alkyl)xanthogens of the formula

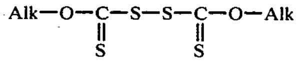

wherein Alk is as defined above.

Zinc di-n-butyldithiocarbamate is a preferred such filler material which provides an additional image enhancing effect.

The functional filler material suitably is used in amounts of from about 2 to about 12, preferably from about 5 to about 10% by weight relative to the total solid content of the coating composition.

A micronized polyolefin or micronized modified polyolefin that has a molecular weight of from 1,000–2,000 and whose melting point is from 240°–700° F. may be included in the coating composition.

It has been found that addition of such a high molecular weight polyolefin such as polyethylene or fluorinated polyethylene to the coating composition substantially eliminates pressure-sensitivity of the coated paper and enhances the environmental stability thereof and also adds to impart whiteness to the paper sheet without affecting the image quality.

The high molecular weight polyethylene or fluorinated polyethylene suitably is included in the coating composition in an amount of from about 2 to about 12, preferably from about 5 to about 10% by weight relative to the total solid content of the coating composition. Suitably it is introduced into the composition in micronized form.

A preferred heat-sensitive coating composition according to the present invention comprises in % by weight relative to the total solid content: from about 9 to about 30% of the chromogenic compound, preferably 6-dimethylamino 3,3-bis(p-dimethylaminophenyl)phthalide;

from about 16 to about 36% of the phenol derivative, preferably 4,4'-isopropylidene diphenol;

from about 16 to about 50% of the substantially water soluble anionic polysaccharide gum, preferably gum arabic;

from about 3 to about 10% of sucrose benzoate;

from about 2 to about 12% of zinc di-n-butyldithiocarbamate; and from about 2 to about 12% of a high molecular weight polyethylene or fluorinated polyethylene having a melting point of from about 240° to about 700° F.

If desired, the heat-sensitive coating composition according to the present invention may additionally include conventional additives for heat-sensitive coating compositions and papers, e.g., binders, carriers and lubricants, such as polyvinylalcohol, methocell glycowax, magnesium stearate and the like.

The coating composition according to the present invention may consist of two separate mixtures; namely, a chromogenic mixture containing the chromogenous compound, a portion of the substantially water soluble anionic polysaccharide gum, and the other ingredients of the coating; and color-developing mixture containing the phenol and the remaining portion of the substantially water soluble anionic polysaccharide gum. Both mixtures may be stored separately and be mixed together before application to the paper, or may be applied separately to the paper to form successive layers of coating thereon.

The heat-sensitive record sheet materials according to the present invention comprise a support sheet which is coated on one or both of its surfaces and/or impregnated with the heat-sensitive composition.

The preferred support sheet material is paper, preferably a thin relatively opaque white paper sheet, from 12–16#/ream 17×22×500 paper.

However, the heat-sensitive composition according to the present invention may also be applied to sheet or bands of film-like polymeric material, woven material or laminated material to form a heat-sensitive record material.

The paper sheet may be coated and/or impregnated with one or more layers of a single heat-sensitive composition containing both the chromogenous compound and the phenol distributed therein; or the phenol and the chromogenous compounds may each be contained in a different layer of a multilayer coating, e.g. the paper may carry a first base coat of a coating mixture containing the phenol covered by a second coat of a coating mixture containing the chromogenous compound.

Alternatively, a first support sheet coated with the coating mixture containing the phenol may be placed into face-to-face relationship with a second support sheet coated with the coating mixture containing the chromogenic compound.

The total amount of coating composition per support material may vary depending on the specific type of paper and the specific composition which are used, as well as the desired printing and processing behavior of the final product.

Satisfactory results are generally obtained with an amount of from about 1.5 to about 3, preferably from about 1.6 to about 2.75 grams of total coating composition per $m^2$ of support paper.

If desired, the heat-sensitive papers according to the present invention may further be provided with an additional protective coating of, for example, a modified co-polymer emulsion.

The heat-sensitive record sheets according to the present invention are prepared by conventional paper-coating methods, e.g. by coating the support paper with an aqueous dispersion of the coating composition by means of rollers, spray brushes or in any other known manner and allowing the coating to dry.

For preparing the aqueous dispersion of the coating composition a first mixture containing the phenol and a portion of the substantially water soluble anionic polysaccharide gum, and a second mixture containing the chromogenous compound, the remainder of the substantially water soluble anionic polysaccharide gum, the sucrose benzoate and any other ingredients each are separately ground with water, suitably at a concentration of between about 10 and about 50%, sufficiently to reduce the solids to an average particle size of several microns, preferably of between about 1 and about 3 microns.

The resulting two dispersions may be mixed together in a single coating composition which may be applied to the paper, optionally after being further diluted with water. Alternatively, the two dispersions may be applied to the paper separately to form different layers of coating.

The invention will now be further described by the following non-limitive example:

EXAMPLE 1

Heat-Sensitive Paper For Thermal Printing Devices

1. Preparation of the coating composition

A chromogenic mixture of solids having the following composition:

| | |
|---|---|
| Gum Arabic | 32.96% |
| Copikem 1 ®[x] | 22.20% |
| Butyl Zimate[xx] | 16.37% |
| Sucrose Benzoate | 12.10% |
| MPP-620 VF[xxx] | 16.37% |
| | 100.00% |

and a phenol-containing mixture of solids having the following composition:

| | |
|---|---|
| Gum Arabic | 32.96% |
| Bis Phenol A[xxxx] | 67.04% |
| | 100.00% |

are prepared.

The two mixtures are charged in separate attritors. Water is added to each of the mixtures up to a solid content of about 30%. The aqueous mixtures are ground sufficiently to reduce the solids to an average particle size of 1-3 microns. The resulting mixtures are combined to form an aqueous formulation of the coating composition, the solid content of which has the following composition:

| | |
|---|---|
| Gum Arabic | 32.96% |
| Copikem 1 ®[x] | 11.10% |
| Butyl Zimate[xx] | 8.17% |
| Sucrose Benzoate | 6.07% |
| MPP-620 VF[xxx] | 8.17% |
| Bis Phenol A[xxxx] | 33.53% |
| | 100.00% |

[x]= tradename for 6-dimethylamino 3,3-bis(p-dimethylaminophenyl)phthalide, manufacturer, Hilton Davis Chemical Company
[xx]= zinc di-n-butyldithiocarbamate
[xxx]= high molecular weight polyethylene, mp>500° F.
[xxxx]= 4,4'-isopropylidenediphenol

2. Preparation of the heat-sensitive paper

The aqueous formulation of the coating composition is applied to the paper sheet in a single layer and dried in a conventional method. The amount of coating of the aqueous formulation which is applied to the paper is adjusted such that the amount of solid coating composition per $m^2$ is 2.1 grams.

It is of course possible and may be desirable, depending upon the ultimate use, to use multiple layers for the color developer and color forming agent such alternatives are well known techniques in the art.

What is claimed is:

1. A heat-sensitive coating composition for a thermoresponsive printing or recording record material for thermal printing devices which comprises:
   - a color-forming amount of a finely divided solid chromogenous basic 3,3-bisarylphthalane derivative, and
   - a color-developing amount of a finely divided solid phenol derivative which at thermal printing temperature is at least partially fluidizable and capable of a color-forming reaction with the chromogenous 3,3-bisarylphthalane derivative distributed in a carrier composition comprising a substantially water soluble anionic polysaccharide gum and a stability enhancing amount of sucrose benzoate.

2. The heat-sensitive coating composition as defined in claim 1 wherein the carrier composition further comprises a filler selected from the group consisting of di(-lower alkyl)dithiocarbamates and lower alkylxanthates of lead, zinc, cadmium and alkaline earth metals and tetra(lower alkyl) thiuram disulfides and di(lower alkyl)xanthogens.

3. The heat-sensitive coating composition as defined in claim 1 wherein the carrier composition further comprises a high molecular polymer selected from the group consisting of micronized polyolefins and micronized modified polyolefins.

4. The heat-sensitive coating composition as defined in claim 1 wherein the polysaccharide gum is gum arabic.

5. The heat-sensitive coating composition as defined in claim 2 wherein the filler is zinc di-n-butyldithiocarbamate.

6. The heat-sensitive coating composition as defined in claim 4 which comprises between about 16 and about 50% by weight of gum arabic and between about 3 and about 10% by weight of sucrose benzoate.

7. The heat-sensitive coating composition as defined in claim 6 which further comprises between about 2 and about 12% by weight of zinc di-n-butyldithiocarbamate and between about 2 and about 12% by weight of micronized polyolefin or micronized modified polyolefin with a molecular weight from about 1,500–2,000 and melting point from about 240°–700° F.

8. The heat-sensitive coating composition as defined in claim 7 which comprises between about 9 and about 30% by weight of the chromogenous 3,3-bisarylphthalane derivative and from about 16 to about 36% of the phenol derivative.

9. The heat-sensitive coating composition as defined in claims 1, 2, 3, 4, 5, 6, 7, or 8 wherein the chromogenous 3,3-bisarylphthalane derivative is 6-dimethylamino-3,3-bis(p-dimethylaminophenyl)phthalide and the phenol derivative is 4,4′-isopropylidenediphenol.

10. The heat-sensitive coating composition as defined in claim 9 which comprises between about 10 and about 15% of 6-dimethylamino-3,3-bis(p-dimethylaminophenyl)phthalide, between about 30 and 35% of gum arabic, between about 5 and about 8% of sucrose benzoate, between about 5 and about 10% of zinc di-n-butyldithiocarbamate and between about 5 and about 10% of the high molecular polymer.

11. A composition for preparing heat-sensitive coating for thermo-responsive record material for thermal printing devices which comprises a chromogenous mixture comprising a color-forming amount of a finely divided solid basic 3,3-bisarylphthalane derivative, gum arabic, a stability enhancing amount of sucrose benzoate, and a separate color-developer mixture comprising a color-developing amount of a finely divided solid phenol derivative which at thermal printing temperature is at least partially fluidizable and capable of a color-forming reaction with the chromogenic 3,3-bisarylphthalane and gum arabic.

12. The composition as defined in claim 11 wherein the chromogenous mixture further comprises zinc di-n-butyldithiocarbamate and a high molecular polymer selected from the group consisting of polyethylenes and fluorinated polyethylenes.

13. A heat-sensitive record sheet for thermal printing devices which comprises a support sheet which carries on at least one of its surfaces the coating composition as defined in claim 1.

* * * * *